(12) United States Patent
Matsunaga

(10) Patent No.: US 8,201,429 B1
(45) Date of Patent: Jun. 19, 2012

(54) BLANKING LINE USING SLITTER AS FEEDER

(75) Inventor: Douglas Matsunaga, Schiller Park, IL (US)

(73) Assignee: Braner USA, Inc., Schiller Park, IL (US)

( * ) Notice: Subject to any disclaimer, the term of this patent is extended or adjusted under 35 U.S.C. 154(b) by 808 days.

(21) Appl. No.: 12/364,623

(22) Filed: Feb. 3, 2009

(51) Int. Cl.
*B21B 15/00* (2006.01)
*B21D 25/00* (2006.01)

(52) U.S. Cl. ............ 72/161; 72/130; 72/147; 72/203; 72/377; 83/94; 83/213; 83/214

(58) Field of Classification Search .......... 72/130, 72/147, 161, 203, 302, 377; 83/94, 210, 83/212, 213, 214
See application file for complete search history.

(56) References Cited

U.S. PATENT DOCUMENTS

| | | | |
|---|---|---|---|
| 2,327,103 A * | 8/1943 | Gude ...................... | 83/94 |
| 2,744,751 A | 5/1956 | Janz | |
| 2,962,943 A | 12/1960 | Mumper | |
| 3,312,095 A | 4/1967 | Remack et al. | |
| 3,718,022 A | 2/1973 | McClain et al. | |
| 3,949,633 A | 4/1976 | Cauffiel | |
| 4,347,723 A | 9/1982 | Bradlee | |
| 4,492,135 A | 1/1985 | Ginn et al. | |
| 4,751,838 A * | 6/1988 | Voges ..................... | 72/302 |
| 4,846,033 A * | 7/1989 | Uehlinger et al. ....... | 83/94 |
| 5,007,318 A | 4/1991 | Cox et al. | |
| 5,086,634 A | 2/1992 | Richards | |
| 5,245,901 A | 9/1993 | Lentz et al. | |
| 5,755,131 A * | 5/1998 | Voth ..................... | 72/240 |

FOREIGN PATENT DOCUMENTS

| | | |
|---|---|---|
| CN | 2555124 Y | 6/2003 |
| CS | 0213303 P | 4/1982 |
| JP | 03027804 A2 | 2/1991 |
| JP | 2005052959 A2 | 3/2005 |

* cited by examiner

*Primary Examiner* — David B Jones
(74) *Attorney, Agent, or Firm* — Botkin & Hall, LLP

(57) ABSTRACT

A blanking line including an uncoiler, a first feeder, a slitter, and a shear. A coil of metal is carried by the uncoiler. The first feeder removes the material from the coil and typically includes a leveler for leveling the metal. The metal is fed from the leveler into a looping pit that is located between the leveler and slitter. The slitter feeds and slits the material a predetermined distance and is driven with servo motors. The looping pit acts as an accumulator allowing the metal to hang so the slitter can move metal intermittently into a shear while the leveler runs at a constant rate. The shear cuts the material to a predetermined length corresponding with the distance that the material is fed by the slitter. A measuring wheel may be included to measure the distance that the material is moved by the slitter.

6 Claims, 4 Drawing Sheets

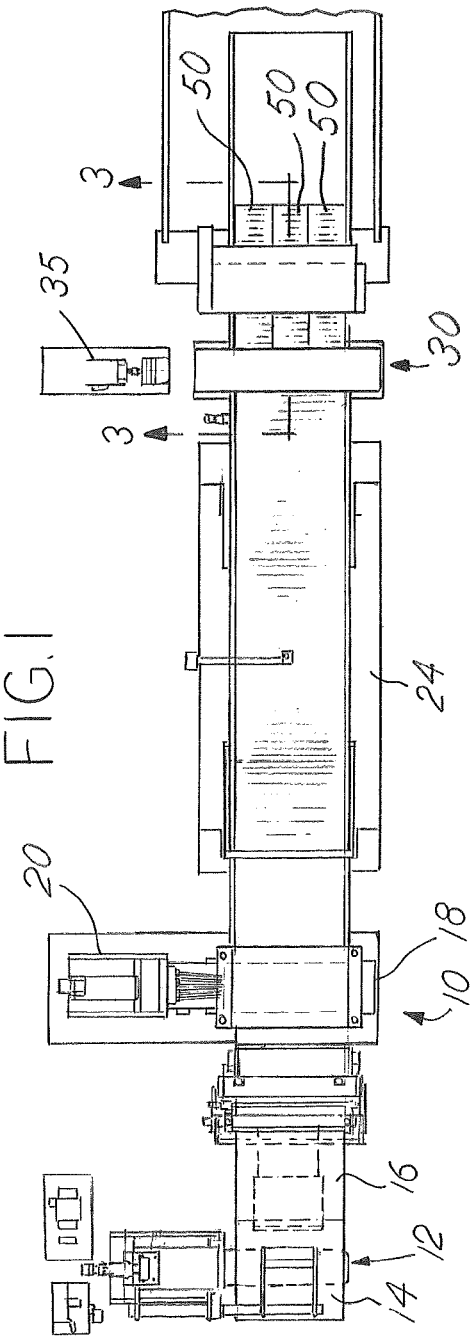
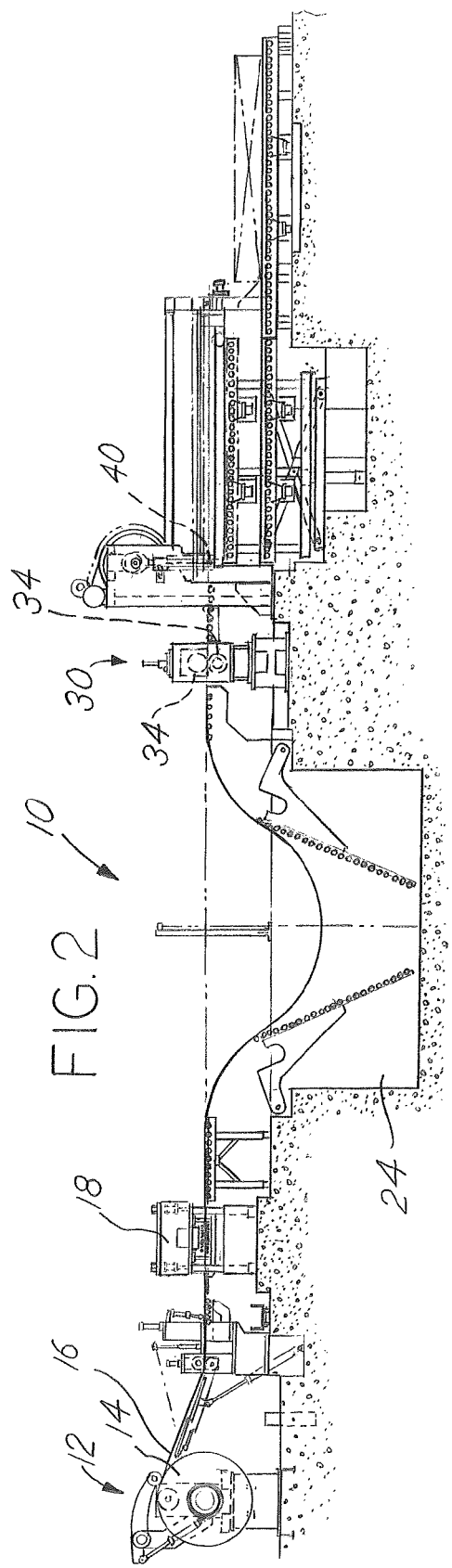

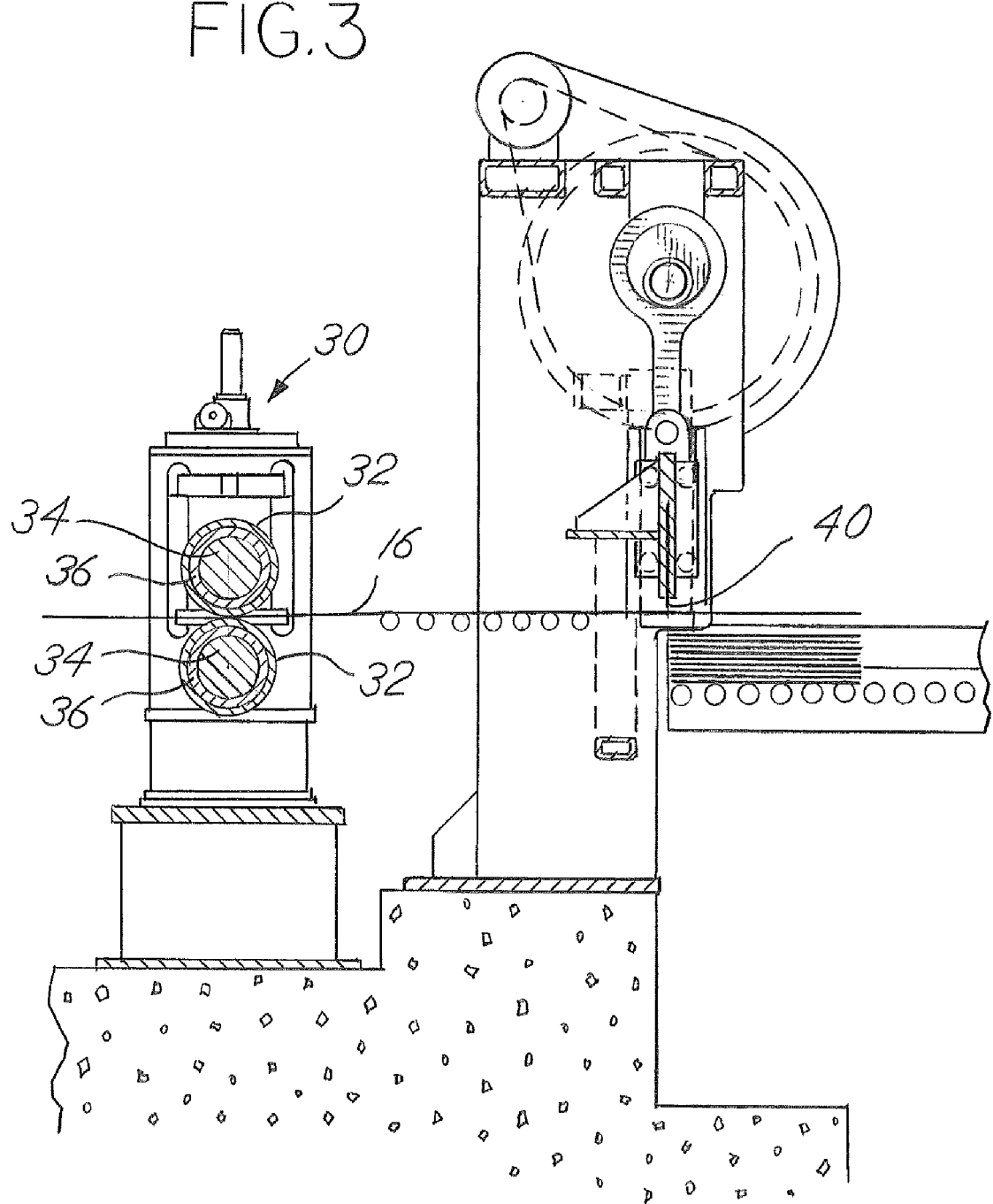

BLANKING LINE USING SLITTER AS FEEDER

BACKGROUND OF THE INVENTION

Producing blanks from a single coil of metal has been a cumbersome process. Typically doing so has required multiple slitting lines or a single line that is difficult to adjust.

When multiple lines are used to form blanks, the coil is run through a slitter that slits the coil into narrower coils having the desired width for each blank; then the individual coils are run laterally through another slitter to get the desired length. This method yields wide tolerances as it is difficult to maintain tight control over the dimensions when switching machines.

When a single line is used to form blanks, the coil is slit in a slitter, then the slit strips hang in a looping pit, and a feed roller after the looping pit moves the strip a predetermined distance into a shear. The distance that the strips are fed into the shear corresponds with the desired length of the blank to be cut in the shear. The method of using a single line may seem much simpler than using multiple lines, but it has many difficulties. In this method, a slitter runs at a constant speed, and the slit strips are fed into a looping pit so that the strips may accumulate as the material is stopped at the feed roller during the shearing operation. Differences in material thickness across a coil make feeding the material uniformly into the shear difficult. Uniform feeding of all the strips is necessary to have uniform blanks. Generally, metal coils from the mill are thicker in the center than at the edges. Therefore, a feed roll moving all the slit strips at the same time must move each strip the same distance regardless of its thickness. A machine operator must oftentimes compensate for this by adjusting the amount of force on the opposing feed rolls at various points along their width. It is rarely possible to get all of the strips to feed at exactly the same rate, and this is evident after running some of the coil some distance because the individual slit strips hang at different levels in the looping pit. This slight difference in feed rates means blanks cut from the multiple strips will vary in their length. Additionally, keeping the strips separate as they enter the feed rolls is difficult. Often this requires separators, which are thin rotating metal discs that go between the slit strips. These must be adjusted for each new job which adds to the time to set up the tooling on each job.

SUMMARY OF THE INVENTION

The blanking line of this invention includes an uncoiler, a first feeder, a slitter, and a shear. A coil of material, usually metal, is carried by an uncoiler. The first feeder removes the material from the coil. In some instances, the first feeder may be a leveler, which also levels the material as it passes through the leveler. The material is fed from a leveler into a looping pit that is located between the first feeder and slitter. The slitter feeds and slits the material. The slitter moves material at an intermittent rate, and the material hangs within the looping pit. The looping pit provides a location for material to accumulate so that the slitter can move material intermittently into the shear while the first feeder runs at a continuous rate.

Servo motors may be used to control the arbors in the slitter. In so doing, the slitter arbors move the material forward a predetermined distance in proportion to the rotation of the slitter arbors. The shear cuts the material to a predetermined length corresponding with the distance that the material is fed by the slitter. A measuring wheel may be included to measure the distance that the material is moved by the slitter.

BRIEF DESCRIPTION OF THE DRAWINGS

FIG. 1 is a view from above of the blanking line;
FIG. 2 is a side view of the blanking line;
FIG. 3 is a sectional view of the slitter and shear.

DETAILED DESCRIPTION OF INVENTION

Figure 4:
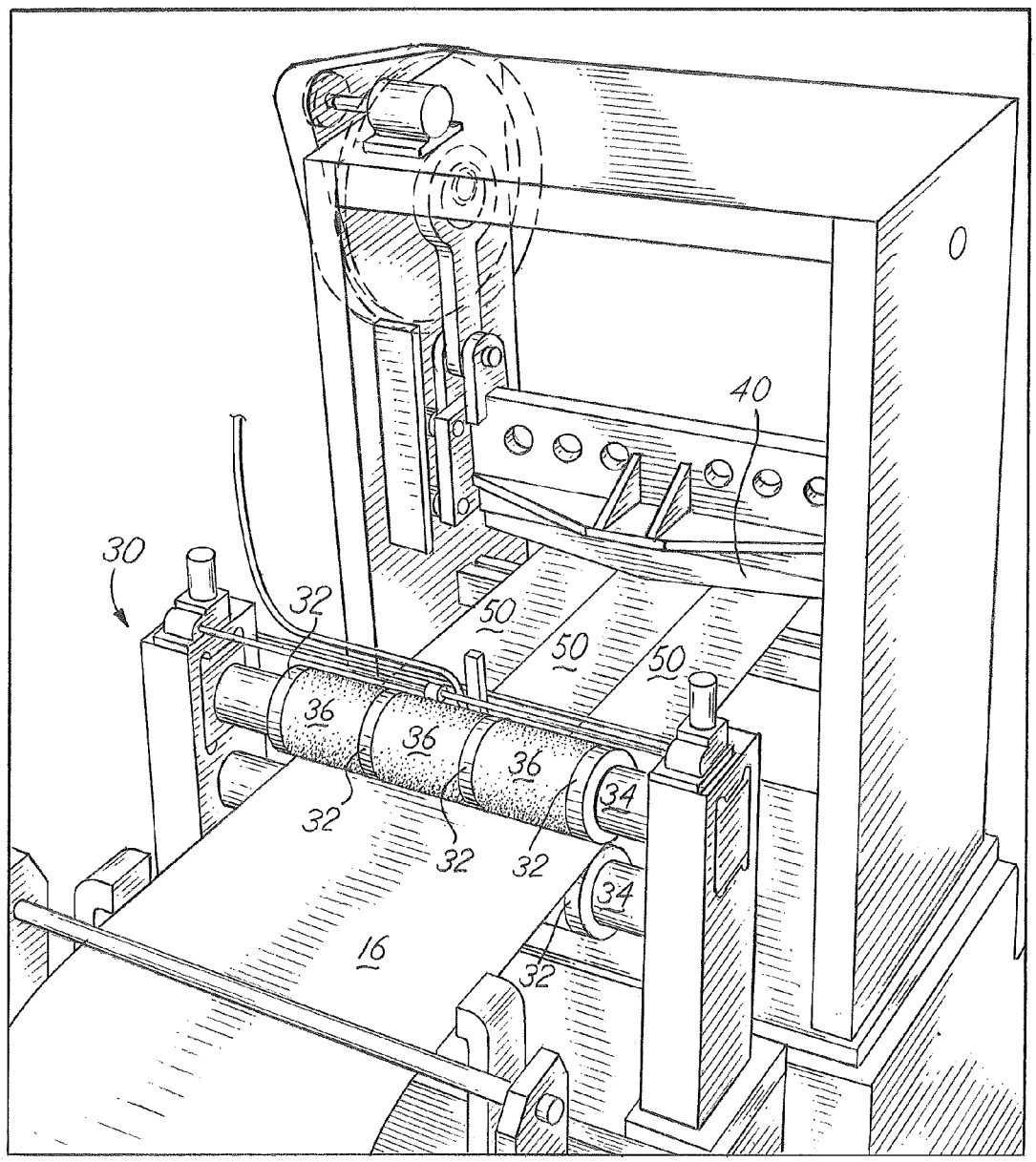
FIG. 4 is a perspective view of the slitter and shear.
Figure 5:
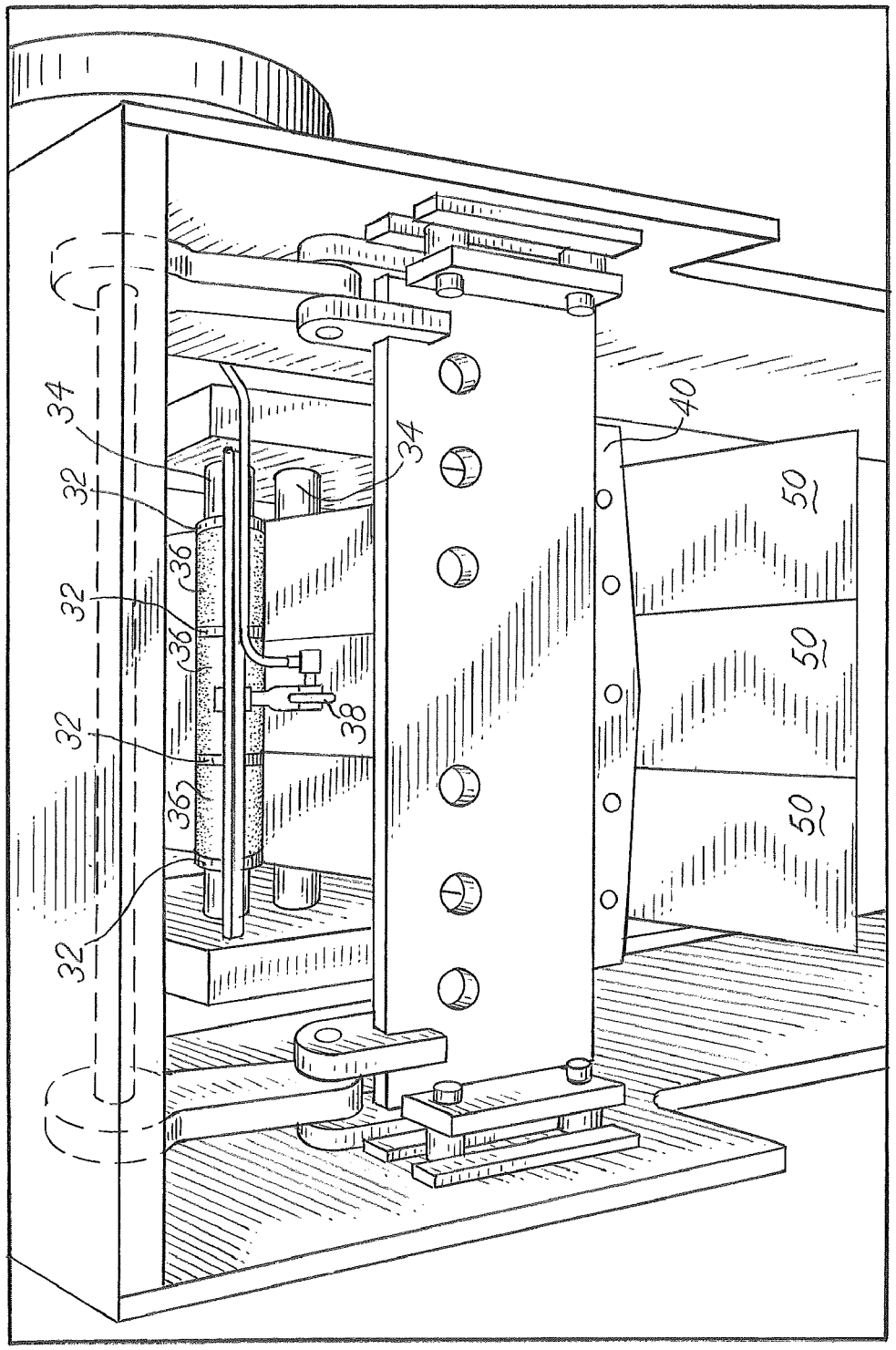
FIG. 5 is another perspective view of the slitter and shear viewed from the opposite direction from the view shown in FIG. 4.

FIG. 1 shows an overview of the blanking line 10 invention from above. The beginning of the blanking line 10 includes an uncoiler 12 that holds a coil 14 of metal 16. The metal 16 is pulled from the coil 14 with a first feeder, which in this case, is a leveler 18. The leveler contains a drive motor 20 that rotates rollers within the leveler 18 to advance the material through the leveler 18 from left to right. Levelers are well known in the art and the inner workings of the leveler 18 are not described. The leveler 18 ensures that the metal 16 is of uniform thickness across its width. Although it is not absolutely necessary that the first feeder be a leveler 18 for leveling the metal 16, tolerances on the final blanks cut from a blanking line where the material is of uniform thickness will be tighter. The leveler 18 feeds material at a constant rate.

The metal 16 leaves the leveler and hangs in a looping pit 24. Unlike prior art blanking lines, the metal 16 is not slit as it enters the looping pit. This can be seen in FIG. 1. The looping pit 24 is between the leveler 18 and a slitter 30. The slitter receives the metal 16 from the looping pit 24. The slitter 30 slits the metal 16 as well as feeds the metal 16. FIG. 4 shows the slitter 30 in detail. The slitter 30 has a series of knives 32 that are spaced on opposing arbors 34. Between the knives 32 are tires 36 that are made from an elastomer material such as rubber. The tires 36 grip the metal and also deform under pressure so that the knives 32 are exposed to slit metal 16. The arbors 34 are driven by a servo motor 35 that moves the metal 16 a predetermined amount through the slitter 30. Servo motors can be made to rotate a predetermined amount based on the input. Such rotation would correspond to a linear movement of the metal 16 proportional to the diameter of the tire 36 contacting the metal 16. Controlling the movement of metal 16 through the slitter 30 by turning the arbors 34 a prescribed amount to advance the metal 16 a predetermined distance would be a precise way to control how much the metal is moved forward if the tires 36 were rigid and did not deform. Since the tires 36 do deform, the exact diameter of the tires 36 cannot be determined as would be possible with a metal roller of the type used in typical feed rollers. Therefore, to obtain accurate measurements of the distance the metal 16 is moved forward in the slitter 30, an external measurement must be made. The external measurement is made by a measuring wheel 38 that presses against the incoming metal 16. The measuring wheel 38 is pressed into the metal 16 with enough force so that the wheel 38 does not slip relative to the metal's 16 surface. The distance that the metal 16 moves is transmitted to a controller which stops the slitter arbors 34 when the metal 16 has been moved a predetermined distance.

The slitter 30 feeds material intermittently into a shear 40. As mentioned earlier the leveler 18 moves metal 16 at a constant rate, but the slitter 30 moves metal 16 intermittently. During the pauses of the slitter 30, the looping pit 24 receives the metal 16 leaving the leveler 18 and the metal 16 accumulating within the looping pit 24. The looping pit acts as an accumulator so slitter 30 can feed metal 16 into the shear 40, and pause while the metal 16 is being cut into blanks.

The slitter 30 and shear 40 can be placed very close to each other so that the strips 50 of slit metal 16 do not travel far from the slitter 30. FIG. 3 shows the close proximity between the shear 40 and the slitter 30. Since the distance from where the metal 16 is slit and where it is sheared is small, complicated systems of guiding the strips 50 are not necessary.

The invention is not limited to the details given above, but may be modified within the scope of the following claims.

What is claimed is:

1. In a blanking line having an uncoiler, a first feeder, a slitter, and a shear, a coil of material being carried by said uncoiler, said material extending through said first feeder and into said slitter, a method for blanking said material comprising the steps:

feeding said material from said coil using said first feeder, wherein said first feeder is a leveler:

leveling said material within said leveler;

slitting and feeding said material into said shear using said slitter, said slitter feeding said material a predetermined distance into said shear;

cutting said material within said shear to a predetermined length corresponding to said predetermined distance that said material is fed by said slitter; and wherein said uncoiler, first feeder, slitter, and shear are in respective serial order.

2. A method of blanking material as claimed in claim 1, wherein said leveler moves said material at a continuous feed rate into a looping pit placed between said leveler and said slitter, said slitter moving said material at an intermittent rate, said material hanging within said looping pit thereby allowing said slitter to move material intermittently by providing a location for said material to accumulate when said slitter is not moving material.

3. The method of blanking material as claimed in claim 2, wherein servo motors rotate arbors of said slitter and control the amount of the rotation.

4. The method of blanking material as claimed in claim 3, wherein a measuring wheel is included to provide a measurement of said distance that said slitter has fed said material, said measuring wheel also providing feedback to control the amount of rotation of said servo motor.

5. A blanking line for use with a coil of material comprising:

a leveler for removing said material from an uncoiler and leveling said material;

a slitter for slitting said material and feeding said material into a shear, said slitter feeding said material a predetermined distance corresponding to the desired length of a blank;

said shear for cutting into blanks; and wherein said uncoiler, leveler, slitter, and shear are in respective serial order.

6. A blanking line as claimed in claim 5, wherein said leveler moves said material at a continuous feed rate into a looping pit placed between said leveler and said slitter, said slitter moving said material at an intermittent rate, said material hanging within said looping pit thereby allowing said slitter to move material intermittently by providing a location for said material to accumulate when said slitter is not moving material.

\* \* \* \* \*